United States Patent [19]

Lugo

[11] Patent Number: 5,676,507

[45] Date of Patent: Oct. 14, 1997

[54] AUTOMOBILE TRANSPORTING TRAILER

[76] Inventor: Paul Lugo, 14993 Slover Ave., Fontana, Calif. 92337

[21] Appl. No.: 404,175

[22] Filed: Mar. 13, 1995

[51] Int. Cl.$^6$ ..................................... B60P 3/08
[52] U.S. Cl. .................. 410/29.1; 410/26; 410/24
[58] Field of Search .................. 410/4, 24, 24.1, 410/26, 27, 29.1; 414/471, 477, 495

[56] References Cited

U.S. PATENT DOCUMENTS

| | | |
|---|---|---|
| 3,104,127 | 9/1963 | Swartzwelder . |
| 3,341,042 | 9/1967 | Carder . |
| 3,650,416 | 3/1972 | Bodenheimer . |
| 3,720,437 | 3/1973 | Lambert . |
| 3,880,457 | 4/1975 | Jones, Jr. . |
| 3,913,496 | 10/1975 | Lohr ................................ 410/27 |
| 3,993,342 | 11/1976 | Jones et al. . |
| 3,994,523 | 11/1976 | Harold . |
| 4,061,390 | 12/1977 | Schall ............................... 410/26 |
| 4,172,612 | 10/1979 | Kinard . |
| 4,369,008 | 1/1983 | Cooper ............................ 410/29.1 |
| 4,750,856 | 6/1988 | Lapiolahti ....................... 414/563 |
| 4,795,303 | 1/1989 | Bubik .............................. 414/478 |
| 4,822,222 | 4/1989 | Zeuner et al. .................. 410/29.1 |
| 5,332,345 | 7/1994 | Lillard ............................ 410/29.1 |

FOREIGN PATENT DOCUMENTS

| | | | |
|---|---|---|---|
| 1337454 | 10/1963 | France ............................. 414/471 |
| 2331463 | 6/1977 | France ............................. 410/26 |
| 56-8725 | 1/1981 | Japan .............................. 410/26 |

*Primary Examiner*—Karen B. Merritt
*Assistant Examiner*—Stephen Gordon
*Attorney, Agent, or Firm*—Knobbe, Martens, Olson & Bear, LLP

[57] ABSTRACT

An improved vehicle carrier having upper and lower levels for receiving a plurality of vehicles. The upper level of the carrier includes a rear table which can be tilted to provide a ramp for vehicles being loaded onto the upper level. Each rear table is lifted up and down by a pair of telescoping struts disposed on either side of the vehicle carrier. A rear pair of telescoping struts is directly attached to the rear table. Each one of the rear pair of telescoping struts is pivotably attached at a lower end to the chassis of the vehicle carrier and is pivotably attached at an upper end to the rear table. A forward pair of telescoping struts is rigidly mounted at a fixed angle to the chassis and has an upper end which is pivotably intermediately attached to a swing arm beam. A rear end of the swing arm beam is pivotably attached to a forward end of the rear table. A forward end of the swing arm beam is adapted with a slot to pivot and translate about a fixed pivot point on the chassis of the vehicle carrier. In extending the fixed angle telescoping strut, the lifting end, or rear end, of the swing arm beam is lifted directly vertically, so that the rear table is raised vertically without any horizontal component of movement.

20 Claims, 3 Drawing Sheets

AUTOMOBILE TRANSPORTING TRAILER

FIELD OF THE INVENTION

The present invention relates to a carrier used for transporting vehicles, sometimes called auto transporters, and more particularly to a vehicle carrier having an improved platform lift.

BACKGROUND OF THE INVENTION

Vehicle carriers of the type pulled by high-power diesel engine tractors typically have a lower level which is immediately above the chassis of the vehicle carrier, and an upper level above the lower level, both levels capable of supporting a row of vehicles. In some of these carriers, vehicles are loaded on the upper level when it is in a lowered position. After loading, the upper level is raised to its transport position in which vehicles may then be loaded on the lower level. Each of the upper and lower levels is typically segregated into individual platforms or tables for supporting a single vehicle. These tables can be manipulated vertically using piston/cylinder arrangements for optimally distributing the tables, and the vehicles thereon, within the space on the carrier.

For vehicles to be driven to the upper-level tables, the rear table is typically utilized as the movable ramp. The rear table is thus lowered to the ramp position for loading vehicles onto the forward upper-level tables. The rear table is then loaded with a vehicle, and raised up into a transport position above the rear end of the carrier to allow vehicles to be loaded onto the tables of the lower level. The rear table is typically raised and lowered by piston cylinders located on either side of the vehicle carrier. This configuration of vehicle carrier allows for easy loading of vehicles. The rear table generally provides a long ramp which the vehicles can drive up. Since the forward tables are in a lowered position when they are loaded, the vehicles do not have to drive up a significant incline to be loaded on the upper level of a vehicle carrier. It can be appreciated that some vehicles, especially sports cars, often have very low clearance which would create significant difficulties when the sports cars have to be loaded up a steep ramp incline.

A common configuration for lifting the rear table of a vehicle carrier is illustrated in FIG. 1. In this drawing, a rigid vehicle carrier chassis 20 is supported on a plurality of wheels 22 arranged for rotation on a pair of axles. The vehicle carrier is provided with a plurality of upper-level tables 24, and a plurality of lower-level tables (not shown). The forward upper-level tables 24 are raised and lowered through the use of a plurality of piston/cylinders (one partially shown at 28) which are rotatably attached at their lower ends to the stationary chassis 20, and at their upper ends to the respective table. The rear table 24a, on the other hand, is pivotably attached at a forward end 26 to a pair of swing arm beams 30 (one shown), on either lateral side of the carrier, each being pivotably attached as at 32 to the fixed chassis 20. Each one of a first pair of piston/cylinders 34 is pivotably attached at a lower end at 36 to the fixed chassis and pivotably attached at an upper end 38 to a rear end of the rear table 24a. Each one of a second pair of piston/cylinders 40 is pivotably attached at 42 to the fixed chassis 20, and pivotably attached at 44 to a midpoint of each of the swing arm beams 30. Each swing arm 30 is a beam-like component pivotably coupled to the fixed pivot point 32 at the forward end 45 and to the rear table 24a at the rear end 46.

The rear end 46 of the beam 30 is called the lifting end. The intermediate piston/cylinder 40 provides a means of moving the swing arm up or down. For example, as the piston/cylinder 40 extends, the lifting end 46 of the swing arm 30 begins to move upward in an arcing path, shown by arrow 47, rotating about the fixed pivot end 32. Because the extending piston/cylinder 40 connecting point 44 on the swing arm 30 is also moving in an arcing path, the piston/cylinder 40 must be attached at its base to the trailer with the pivoting connection 42. As the lifting end 46 of the swing arm 30 raises the rear table 24a, the rear table not only travels up and down, but also has a forward horizontal component of movement, as indicated at A.

As seen in FIG. 1, a vehicle 48 loaded on the middle upper-level table 24 might be loaded so that its rearward bumper extends slightly rearward from the middle table. In this situation, a vehicle 49 loaded on the rear table 24a may contact the bumper of the middle vehicle when being lifted into a loaded position. More particularly, raising the rear table 24a causes the vehicle 49 to travel in an upward and forward arc so that it also has a forward component of motion corresponding to the motion indicated at "A". Hence the front bumper of vehicle 49 may contact the rear bumper of the middle vehicle 48. This contact may prevent the rear table from being fully lifted into its loaded position and it may also cause damage to the vehicles.

Because of the drawbacks with the prior art vehicle carriers, an improved vehicle carrier is needed which reduces the chance of two vehicles colliding when adjacent support tables are raised relative to each other.

SUMMARY OF THE INVENTION

The aforementioned needs are satisfied by the vehicle carrier of the present invention which is comprised of a frame, an upper level and a lower level, wherein the upper and lower levels are configured to receive a plurality of vehicles for transport, and a rear table which provides access to the upper level and also is configured to receive a vehicle for transport. The rear table is lifted by a lifting mechanism which is configured to lift the rear table to a raised position so that a vehicle positioned for transport on the rear table does not move forward to collide with another vehicle positioned on the upper level for transport.

In one aspect of the present invention, the lifting mechanism is comprised of a cantilevered lifting member that is both pivotally and slidably engaged with the frame of the vehicle carrier, a lifting element that is fixedly attached to the frame and pivotally attached to the lifting member so that the lifting element exerts a lifting force against the cantilevered member in a single direction thereby causing the cantilevered end of the lifting member to pivot upward. The cantilevered end of the lifting member is pivotally attached to a first end of the rear table so that upward movement of the lifting member causes the first end of the rear table to move upward. The cantilevered member is preferably slidably engaged with the frame so that forward motion of the cantilevered end of the lifting member and the rear table, as a result of being lifted by the lifting member, is minimized.

In the preferred embodiment, the cantilevered lifting member is engaged with a pivot rod that is captured within a slot so that the pivot rod can slide within the slot giving the cantilevered lifting member a degree of horizontal movement. Further, the fixed lifting element exerts a lifting force against the cantilevered lifting member that has a horizontal component that is rearwardly directed. The slot is configured to allow the cantilevered lifting member to slide rearwardly so as to reduce the tendency of the first end of the rear table to move forwardly in response to the cantilevered end of the lifting member pivoting about the pivot point. Once the first end of the rear table is in a raised position, a second lifting element raises a second end of the rear table so that the rear table is substantially parallel the upper level of the vehicle carrier.

Hence, the preferred embodiment can reduce any forward motion of the rear table as a result of the rear table being raised. This diminishes the risk of an automobile positioned on the rear table colliding with another automobile positioned on the upper level.

These and other objects and features of the present invention will become more fully apparent from the following description and appended claims taken in conjunction with the accompanying drawings.

DESCRIPTION OF THE PREFERRED EMBODIMENTS

The present invention is described in terms of an improved lifting mechanism for a rear table of a vehicle carrier. The improved lifting mechanism, however, can be incorporated into the vehicle carrier in various locations other than for lifting the rear table. The improvement provides a means for lifting a table of the vehicle carrier wherein horizontal translation of the vehicle is reduced.

Figure 1:
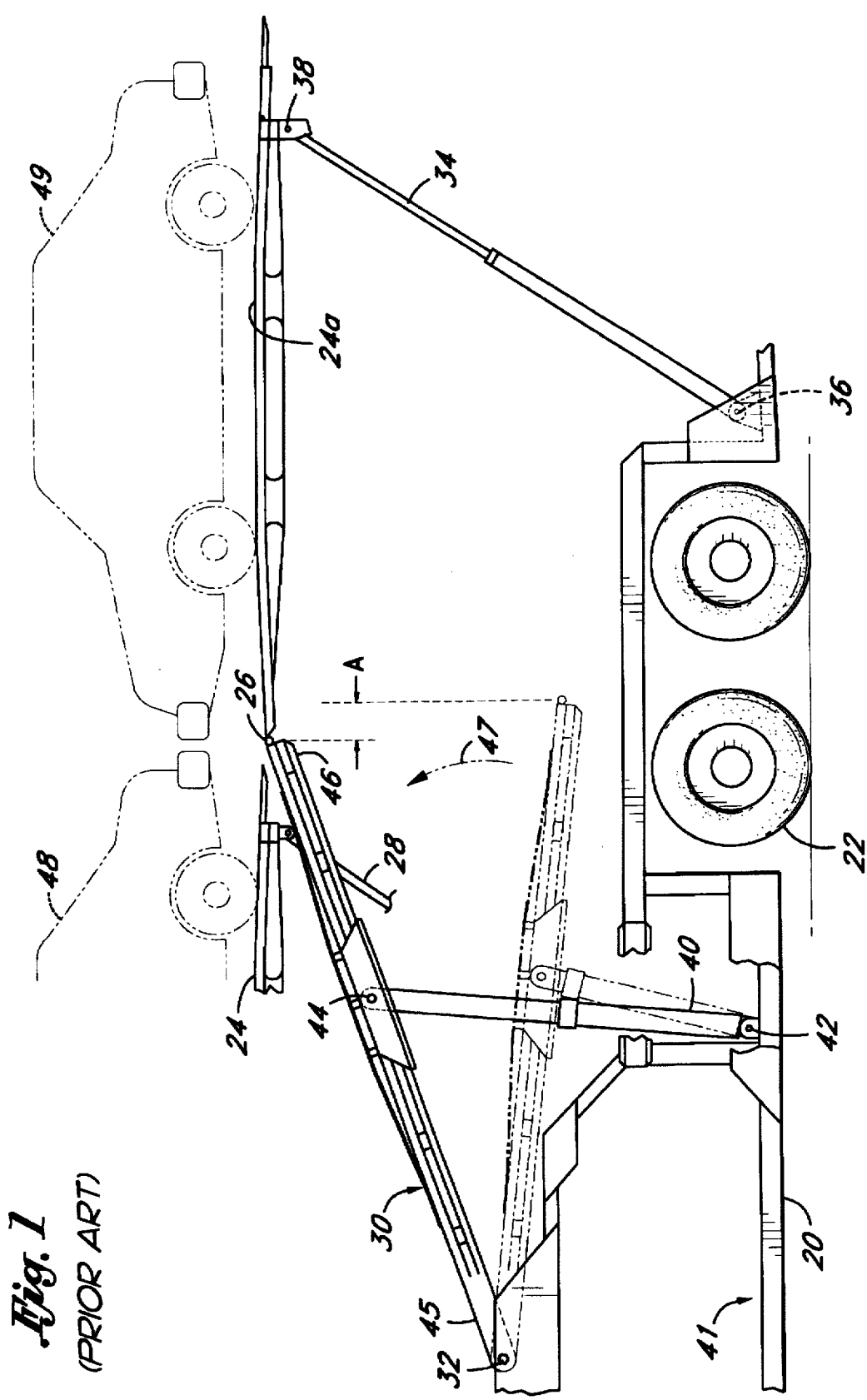
FIG. 1 is a side elevational view of a vehicle carrier of the prior art.
Figure 2:
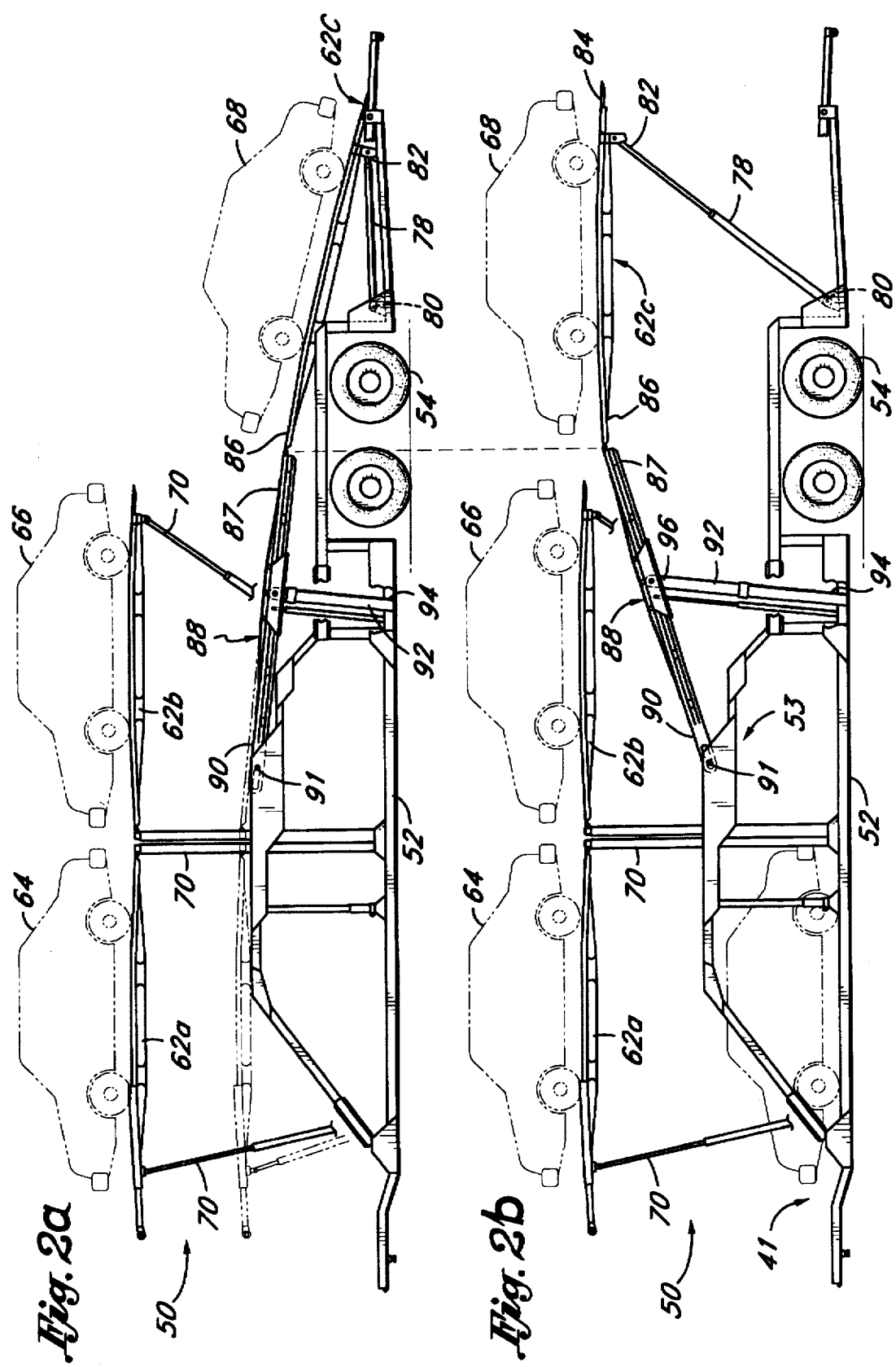
FIG. 2a is a side elevational view of a vehicle carrier of the present invention shown with a rear table in a vehicle loading position.
FIG. 2b is a side elevational view of the vehicle carrier of the present invention with a rear table in a vehicle loaded position.

A vehicle carrier 50 incorporating the present invention is illustrated in FIGS. 2a and 2b. The vehicle carrier 50 includes a rigid chassis 52 supported on a plurality of wheels 54 which are rotatably mounted on a pair of axles. The vehicle carrier 50 is provided with a plurality of tables for supporting vehicles thereon to thereby allow the vehicles to be transported. Typically, vehicle carriers 50 are adapted to carry a plurality of vehicles, e.g., six or sometimes eight vehicles, with half of the vehicles on a lower level and half of the vehicles on an upper level. In the illustrated embodiment, the upper level includes three support tables 62a, 62b, 62c. In FIG. 2a, the upper level is shown partially loaded with a front table 62a supporting a first vehicle 64 and a middle table 62b supporting a second vehicle 66. A third vehicle 68 is shown loaded onto the rear table 62c, which is in a lowered or loading position. FIG. 2b illustrates the rear table 62c, in a raised or loaded position.

The front table 62a and middle table 62b are supported on the chassis 52 with a plurality of extendable telescoping struts, or piston/cylinder arrangements 70. Each end of these struts 70 is pivotably attached to the respective table 62a,b and to the chassis 52. The front and middle tables 62a,b can thus be raised or lowered and tilted at various angles. In FIG. 2a, the forward tables 62a,b are shown in their lowered position in phantom. When the tables 62a,b are in their lowered position, the rear table 62c forms a ramp which allows the vehicles to be driven up to the forward tables 62a,b. Once the vehicles are loaded on the forward tables 62a,b, and secured to these tables, the tables 62a,b are then elevated to their raised or storage position as shown in FIG. 2a and 2b. It can be appreciated that in the lower position, the tables 62a,b are easily accessible via the ramp formed by the rear table 62c to allow vehicles to be driven up to the forward tables 62a,b. Further, it can be appreciated that in the raised position, the tables 62a,b are elevated high enough so that vehicles can be loaded on to the lower level 41 in the manner illustrated in FIG. 2b.

The rear table 62c can also be positioned into a raised position, shown in FIG. 2b, wherein the rear table 62c provides a platform for transporting a vehicle 68. Hence, the rear table 62c is used as a ramp to load the forward tables 62a,b in its lowered position, and is also used to provide a platform for transporting vehicles in its raised position.

In this embodiment, the rear table 62c, is directly supported by two telescoping struts 78 which are positioned on both sides of the vehicle carrier 50. Each of the telescoping struts 78 includes a lower end 80 which is pivotably attached to the chassis 52 and an upper end 82 which is pivotably attached to a point at the rear end 84 of the rear table 62c. The front end 86 of the rear table 62c is pivotably attached to a lifting end 87 of two cantilevered swing arm beams or members 88 which are also positioned on both sides of the vehicle carrier. The forward ends 90 of the swing arm beams are pivotable about a fixed pin 91 mounted on a mid-level support 53 of the chassis 52. A fixed angle telescoping strut 92 raises and lowers the swing arm beam 88. More particularly, the telescoping strut 92 has a lower end 94 which is fixedly attached to the chassis 52. An upper end 96 of the telescoping strut 92 is pivotally attached to an intermediate portion of the swing arm beam 88. Extending and retracting the fixed angle telescoping strut 92 causes the lifting end 87 of the swing arm beam 88 to raise and lower, which in turn causes the forward end 86 of the rear table 62c to raise and lower. Hence, the rear table 62c is raised by preferably simultaneously extending the telescoping strut 78 and the fixed angle telescoping strut 92 and is lowered by simultaneously retracting each of these struts.

Each of the telescoping struts 70, 78 and 92 used to raise and lower the tables 62a,b,c are preferably comprised of well-known hydraulic pistons that are actuated by a hydraulic pump with associated controls. It can be appreciated, however, that other comparable pistons, e.g., air pistons can also be used without departing from the scope of the present invention.

Figure 3:
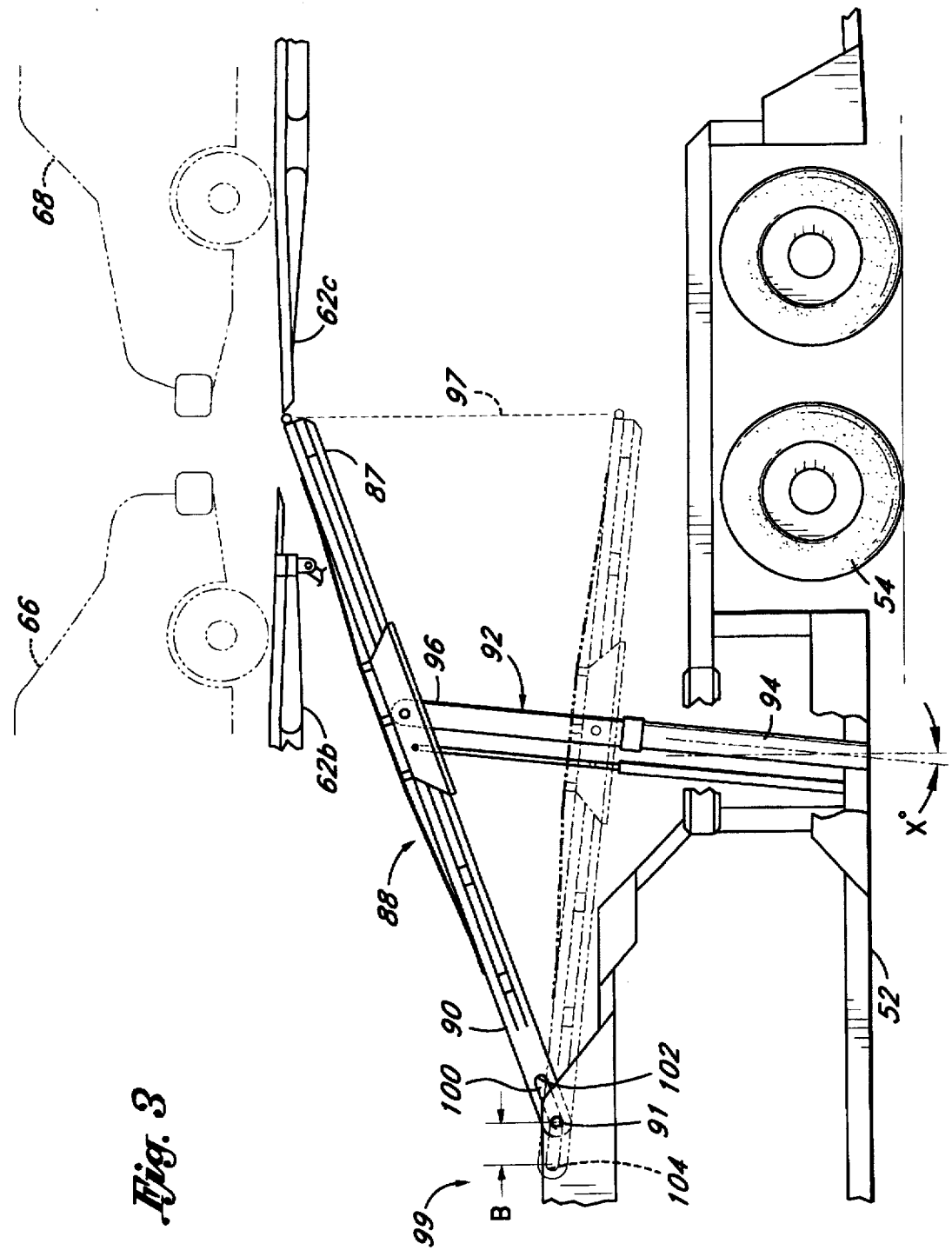
FIG. 3 is an enlarged elevational view of an improved table lifting mechanism of the vehicle carrier.

Now with reference to FIG. 3, it will be shown that a traveling pivot 99 of the forward end 90 of the swing arm beam allows the rear table 62c to be raised and lowered with respect to the chassis 52 without experiencing any significant horizontal movement. More particularly, as the fixed angle telescoping strut 92 begins to extend, it must travel in a straight line in a given direction which is determined by the stationary angle position of the strut 92. In the embodiment shown in FIG. 3, the fixed angle position of the strut 92 causes the telescoping end of the strut 92 to project at an angle X° from vertical. The angle X° is selected in accordance with the principles described herein below. The extending movement of the strut 92 causes the upper end 96 to be raised and moved in a rearward direction. The lifting end 87 of the swing arm beam 88 is raised vertically upward along line 97 with a reduced horizontal component due to the traveling pivot connection of the forward end 90 of the swing arm beam 88. The forward end 90 of the swing arm beam thus pivots and slides over the fixed pin 91. The forward end 90 of the swing arm beam 88 is provided with a wide portion having an elongated slot 100 formed therein and generally extending along the longitudinal axis of the beam. As shown in FIGS. 2a and 3, the fixed pin 91 is initially located at a rearward end 102 of the elongated slot 100 when the rear table 62c is in the lowered position wherein it provides a ramp access to the forward tables 62a,b. When the rear table 62c is moved to the raised position, the swing arm beam 88 both pivots about the fixed pin 91 and translates thereover so that the fixed pin ends up at the forward end 104 of the slot 100. The length of the elongated slot is given at B.

It can be seen that the lifting end 87 of the swing arm beam 88 allows the rear table 62c to be lifted in a vertical direction with a reduced horizontal component of movement. Thus, the vehicle 68 loaded onto the rear table 62c is elevated vertically with reduced forward movement, as was inherent in the previously described prior art lifting mechanisms. Hence, the danger of the forward bumper of the vehicle 68 coming into contact with the rearward bumper of the second vehicle 66 on the middle table 62b and thereby damaging the vehicles is minimized.

The length B of the slot 100 is therefore preferably calculated to be that which is necessary to allow the extending section of the strut 92 to fully travel its predetermined length. Once the strut 92 is fully extended, the swing arm beam 88 is at its maximum desired height. The length of the slot B is then necessarily required to allow the swing arm beam 88 to freely move rearward due to the fixed lifting angle X° of the strut 92. Conversely, the length of the slot B is also necessarily calculated to allow for the complete forward movement of the swing arm beam 88 as the strut 92 retracts to its fully lowered position.

Further, the length of the slot 100 is preferably calculated to reduce any horizontal translation of the lifting end 87, stemming from the lifting end 87 swinging in an arc when the strut 92 is extended. More particularly, when the strut 92 is extended, the lifting end 87 of the swing arm beam 88 is disposed to travel in an arc that has a forwardly directed horizontal component which is directly related to the cosine of the angle that the telescoping strut 92 forms with the horizontal. Similarly, when the strut 92 is retracted, the lifting end 87 of the swing arm beam 88 is disposed to travel in an arc that has a rearwardly directed horizontal component.

However, since the pivot pin 91 is positioned within the generally horizontal slot 100 on the swing arm beam 88 in this preferred embodiment, the swing arm beam 88 experiences horizontal translation about the pivot pin 91 as a result of the strut 92 being extended or retracted, which is limited by the extension of the strut 92 and the slot 100. The horizontal translation about the pivot pin 91 is in a rearward direction when the strut 92 is extended and is in a forward direction when the strut 92 is retracted. Hence, the horizontal translation of the swing arm beam 88 about the pivot pin is in a direction which is opposite the direction of the horizontal component of the arc that the lifting end 87 is disposed to travel as a result of extending or retracting the fixed strut 92.

The preferred embodiment of the present invention thereby discloses a lifting mechanism for lifting and lowering a rear table of the upper deck of an auto carrier where the tendency of the rear table to experience horizontal movement as a result of lifting and lowering the rear table is reduced. The rear table and the lifting mechanism is further configured to permit vehicles to be driven to the upper deck and is also capable of supporting a vehicle. Hence, the present invention allows for easy access and storage of vehicles to be transported while minimizing the problem of damage to the vehicles as a result of the operation of a mechanism for lifting vehicles to an upper deck.

Although this invention has been described in terms of certain preferred embodiments, other embodiments that are apparent to those of ordinary skill in the art are also within the scope of this invention. Accordingly, the scope of the invention is intended to be defined by the claims that follow.

I claim:

1. An apparatus for carrying vehicles comprising:
   a chassis;
   a lower level comprised of one or more tables configured to receive vehicles for transport;
   an upper level comprised of at least one forward table configured to transport a first vehicle wherein said at least one forward table is movable between a lowered position, wherein said at least one forward table is configured to receive said first vehicle for transport, and a raised position, wherein said at least one forward table is configured to transport said vehicle;
   a rear table having a first position wherein said rear table provides a ramp for vehicles to be loaded onto said upper level and a second position wherein said rear table provides a platform which is configured to transport a second vehicle when said rear table is in said second position; and
   a lifting mechanism operably engaged with said rear table so as to move said rear table between said first and said second positions, said lifting mechanism pivotally mounted to said chassis and to said rear table so as to move said rear table between said first and said second positions wherein said lifting mechanism is connected to a forward end of said rear table and moves said forward end in a pivoting arc while moving said rear table between said first and said second positions and wherein said lifting mechanism is configured to simultaneously exert a force in a second direction against said rear table during movement of said rear table between said first and said second positions such that horizontal movement of said rear table in a first direction, during movement of said rear table between said first and said second positions is limited by said force exerted in said second direction, so as to prevent said second vehicle positioned on said rear table from touching said first vehicle positioned on said at least one forward table when said rear table is moved between said first and said second positions.

2. The apparatus of claim 1, wherein said lifting mechanism is comprised of:
   a first cantilevered swing arm member which is pivotally attached to said chassis and is pivotally attached to said forward end of said rear table; and
   a first extendable lifting member attached to said chassis and said cantilevered swing arm member, wherein said first extendable lifting member is configured to exert a force in a first upward direction against said first cantilevered swing arm member to induce said rear table to move upward to said second position.

3. The apparatus of claim 2, wherein said first cantilevered swing arm member is slidably engaged with said chassis so that said first cantilevered swing arm member is movable in said second direction while said rear table is moving between said first and said second position.

4. The apparatus of claim 3, wherein said chassis includes a first pivot pin and said first cantilevered swing arm member includes a slot which extends for a first distance along the length of said first cantilevered swing arm member and wherein said first pivot pin is captured in said slot so that said first cantilevered member is pivotable about said first pivot pin and is slidably engaged with said first pivot pin.

5. The apparatus of claim 4, wherein said pivot pin is disposed towards a rear end of said slot when said rear table is in said first position, and said pivot pin is disposed toward a forward end of said slot when said rear table is in said second position.

6. The apparatus of claim 4, wherein said first distance is selected so as to permit the first cantilevered swing arm member to move in said second direction during movement of said rear table between said first and second positions a distance sufficient to prevent said rear table moving forward toward said at least one forward table such that said second vehicle would touch said first vehicle on said at least one forward table.

7. The apparatus of claim 2, wherein said first cantilevered swing arm member induces a forward end of said rear table to be raised.

8. The apparatus of claim 7, wherein said lifting mechanism further comprises a second extendable lifting member attached to said chassis and a rear end of said rear table so that both said first and said second extendable lifting members induce said rear table to move to said second position.

9. The apparatus of claim 8, wherein said rear table is substantially co-planar with said upper level when said rear table is in said second position.

10. The apparatus of claim 2, wherein said lifting mechanism further comprises:
   a second cantilevered swing arm member which is pivotally attached to said chassis and is attached to said forward end of said rear table; and
   a second extendable lifting member attached to said chassis and said second cantilevered swing arm member, wherein said second extendable lifting member is configured to exert a force in a first direction against said second cantilevered swing arm member to induce said rear table to move upward to said second position.

11. The apparatus of claim 10, wherein said second cantilevered swing arm member is slidably engaged with said chassis so that said second cantilevered swing arm member is movable in said second direction while said rear table is moving between said first and said second positions.

12. The apparatus of claim 10, wherein said first and said second cantilevered swing arm members are positioned adjacent first and second lateral sides of said chassis.

13. The apparatus of claim 10, wherein said first extendable lifting member and said second extendable lifting member are comprised of hydraulic pistons.

14. The apparatus of claim 10, wherein said first extendable lifting member is attached to a midpoint along said first swing arm member and said second extendable lifting member is attached to a midpoint along said second swing arm member.

15. The apparatus of claim 1, wherein when said at least one forward table is in said raised position and said rear table is in said second position, sufficient clearance is provided between said upper and said lower levels to permit one or more vehicles to be loaded onto said lower level for transport.

16. An apparatus for carrying vehicles comprising:
   transporting means for transporting one or more vehicles on an upper level and a lower level;
   ramp means for providing access to said upper level for a vehicle to be positioned thereon, wherein said ramp means is configured to provide access to said upper level in a first position and said ramp means is configured to provide a platform for a first vehicle to be transported in a second position; and
   lifting means for moving said ramp means between said first and said second positions, wherein said lifting means is engaged to said transporting means and to said ramp means such that horizontal movement of said ramp means in a first direction during movement of said ramp means between said first and second positions is at least partially offset by simultaneous horizontal movement of said lifting means in a second direction opposite said first direction so that said first vehicle positioned on said ramp means does not touch a second vehicle positioned on said upper level when said ramp means is moved between said first and said second positions.

17. The apparatus of claim 16, wherein said means for transporting comprises a chassis with said lower level comprised of one or more tables configured to receive vehicles for transport and said upper level comprised of at least one forward table configured to transport a first vehicle wherein said at least one forward table is movable between a lowered position, wherein said at least one forward table is configured to receive said first vehicle for transport, and a raised position, wherein said at least one forward table is configured to transport said vehicle.

18. The apparatus of claim 17, wherein said ramp means comprises a rear table having a first position wherein said rear table provides a ramp for vehicles to be loaded onto said upper level and a second position wherein said rear table provides a platform which is configured to transport a second vehicle when said rear table is in said second position.

19. The apparatus of claim 18, wherein said lifting means comprises a lifting mechanism operably engaged with said rear table so as to move said rear table between said first and said second positions, said lifting mechanism pivotally mounted to said chassis and to a forward end of said rear table and moves said forward end in a pivoting arc while moving said rear table between said first and said second positions and wherein said lifting mechanism is configured to simultaneously exert a force in a second direction against said rear table during movement of said rear table between said first and said second positions such that horizontal movement of said rear table in a first direction during movement of said rear table between said first and said second positions is limited by said force exerted in said second direction so as to prevent said vehicle positioned on said rear table from touching a first vehicle positioned on said at least one forward table when said rear table is moved between said first and said second positions.

20. A vehicle carrier having an upper level including a forward table for supporting a vehicle thereon, said carrier comprising:
   a rigid chassis supported for movement along the road on a plurality of wheels;
   a rear table moveable between a first position providing a ramp for vehicles to be loaded onto said forward table and a second position substantially coplanar with said forward table;
   a pair of swing arm beams each having a first end and a second end, said first end slidably and pivotably coupled to a fixed point on said chassis and said second end pivotably coupled to a forward end of said rear table;
   a pair of piston/cylinders each mounted at a lower end at a fixed angle to said chassis and pivotably mounted at an upper end to a midpoint along one of said swing arm beams, said piston/cylinders extending to lift said second ends of said swing arm beams for positioning said rear table in said second position and retracting to lower said second ends of said swing arm beams for positioning said rear table in said first position, each said second end of said swing arm beam being raised in an arc defined by the pivoting motion of said swing arm beam about a lower end of said swing arm beam and wherein said pair of piston/cylinders are mounted at said fixed angle that is selected so as to impart a rearward motion on said swing arm beams when said swing arm beam is being raised so as to reduce the forward movement of said rear table attached to said swing arm beam as a result of said swing arm beam pivoting in said arc.

* * * * *